(12) United States Patent
Morimoto et al.

(10) Patent No.: US 7,688,893 B2
(45) Date of Patent: Mar. 30, 2010

(54) VIDEO ENCODER AND PORTABLE RADIO TERMINAL DEVICE

(75) Inventors: Michiyo Morimoto, Fuchu (JP);
Yoshihiro Kikuchi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1405 days.

(21) Appl. No.: 11/089,648

(22) Filed: Mar. 25, 2005

(65) Prior Publication Data
US 2006/0215763 A1 Sep. 28, 2006

(30) Foreign Application Priority Data
Mar. 23, 2005 (JP) .............................. 2005-084777

(51) Int. Cl.
*H04N 11/02* (2006.01)
*H04B 1/66* (2006.01)

(52) U.S. Cl. ................................. 375/240.12
(58) Field of Classification Search ............. 375/240.12
See application file for complete search history.

(56) References Cited

U.S. PATENT DOCUMENTS

| | | | | |
|---|---|---|---|---|
| 5,786,855 | A * | 7/1998 | Chen et al. ................ | 348/391.1 |
| 6,157,676 | A | 12/2000 | Takaoka et al. | |
| 7,466,774 | B2 * | 12/2008 | Boyce ........................ | 375/342 |
| 2004/0213348 | A1 | 10/2004 | Kim et al. | |
| 2008/0037637 | A1 | 2/2008 | Kawashima et al. | |

FOREIGN PATENT DOCUMENTS

| | | |
|---|---|---|
| EP | 0 895 424 A2 | 2/1999 |
| WO | WO 2004/064255 A2 | 7/2004 |

OTHER PUBLICATIONS

Wiegand, Thomas, et al, "Overview of the H.264/AVC video coding standard", IEEE Transactions on Circuits and Systems for Video Technology, IEEE Service Center, Piscataway, N.J., vol. 13, No. 7, Jul. 1, 2003, pp. 560-576, XP011099249, ISSN: 1051-8215.

(Continued)

*Primary Examiner*—Tung Vo
*Assistant Examiner*—Anner Holder
(74) *Attorney, Agent, or Firm*—Frishauf, Holtz, Goodman & Chick, P.C.

(57) ABSTRACT

A prediction mode determining unit of a video encoder comprises a primary evaluative value calculating unit which calculates each primary evaluative value of a plurality of primary evaluative values corresponding respectively to a plurality of 4×4 intra-prediction modes with different prediction directions, for each of a plurality of 4×4-pixel blocks, using the motion picture signal as a reference image signal, a secondary evaluative value calculating unit which calculates each of a plurality of secondary evaluative values corresponding respectively to the 4×4 intra-prediction modes, by applying to the primary evaluative value, weight summing which uses an evaluation coefficient corresponding to a position of each of the 4×4-pixel blocks, determining unit which determines a coding prediction mode for each macro-block, using the secondary evaluative values, and coding unit which codes the motion picture signal in accordance with the coding prediction mode.

16 Claims, 11 Drawing Sheets

OTHER PUBLICATIONS

European Search Report dated Dec. 12, 2008, issued in a counterpart European Application.
Article entitled A Study on Efficient Intra Prediction Method in H.264 Encoding, Koichi Takagi, et al, KDDI Research Institute, ITE Winter Annual Convention 2004.
Publication entitled Joint Model Reference Encoding Methods and Decoding Concealment Methods, Document JVT-J049, Mar. 2, 2004, Table of Contents pp. I-iv and pp. 1-34.
Related U.S. Appl. No. 11/796,948, filed Apr. 30, 2007; ; Inventors: Yuji Kawashima et al; Title: Moving Picture Encoding Apparatus.

* cited by examiner

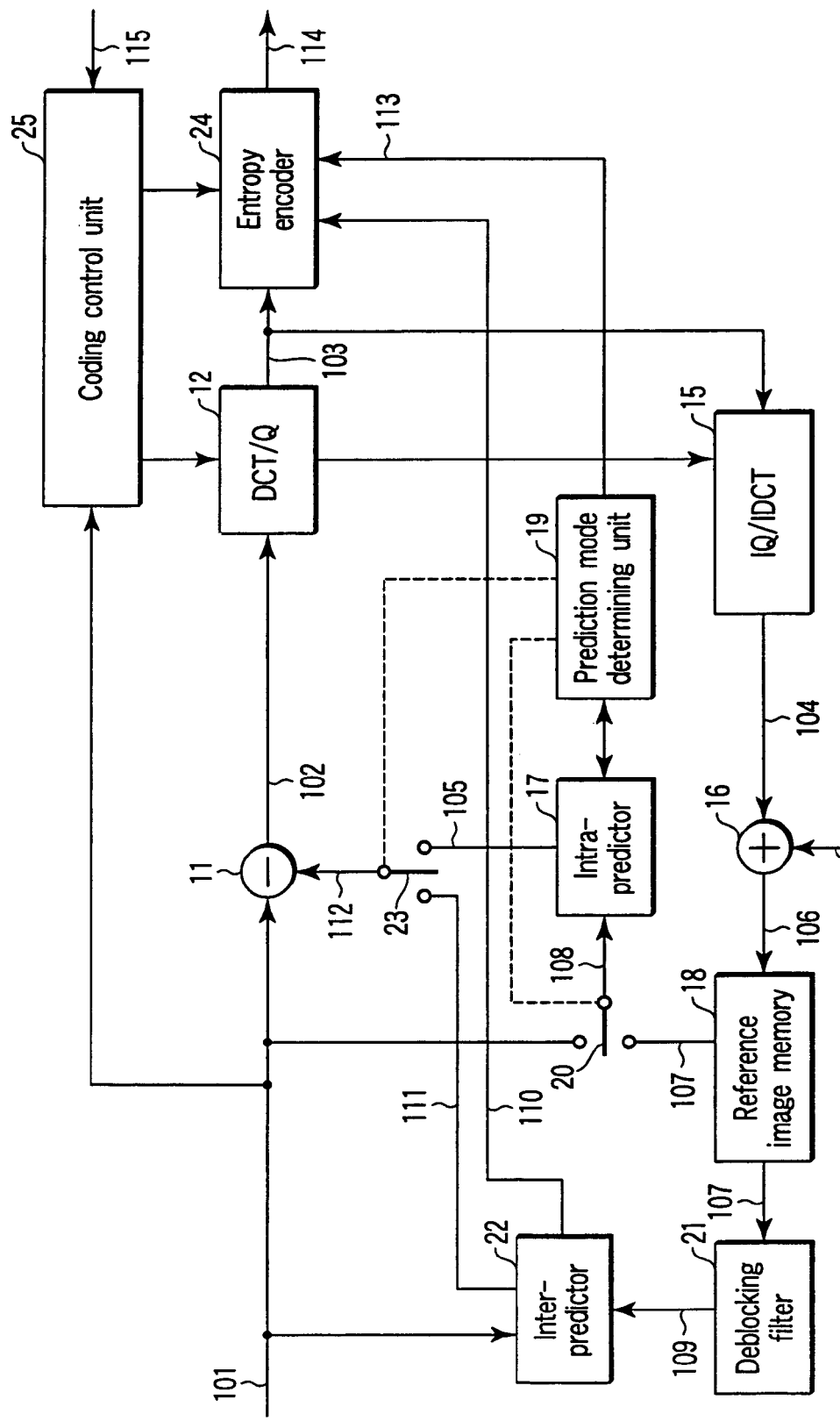
F I G. 1

| a0 | a1 | a1 | a1 |
|----|----|----|----|
| a2 | a3 | a4 | a5 |
| a2 | a4 | a5 | a6 |
| a2 | a5 | a6 | a7 |

| 1.3 | 1.0 | 1.0 | 1.0 |
|-----|-----|-----|-----|
| 0.6 | 0.5 | 0.4 | 0.3 |
| 0.6 | 0.4 | 0.3 | 0.2 |
| 0.6 | 0.3 | 0.2 | 0.1 |

| a0 | b1 | b2 | b3 |
|----|----|----|----|
| a1 | a4 | b4 | b5 |
| a2 | a5 | a7 | b6 |
| a3 | a6 | a8 | a9 |

| 1.6 | 1.5 | 1.4 | 1.3 |
|-----|-----|-----|-----|
| 1.2 | 0.9 | 0.8 | 0.7 |
| 1.1 | 0.6 | 0.4 | 0.3 |
| 1.0 | 0.5 | 0.2 | 0.1 |

All 4×4 pixel intra-prediction modes (0 to 8) 2 except DC mode

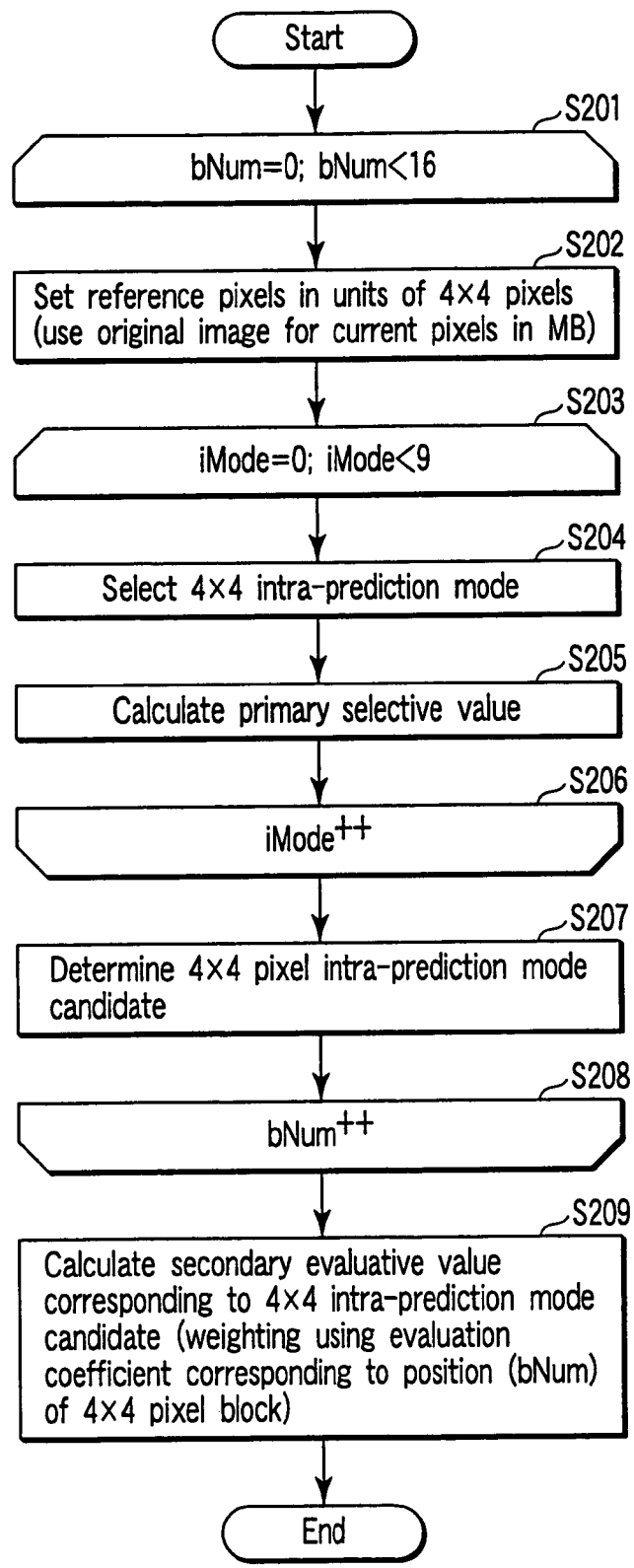
F I G. 7

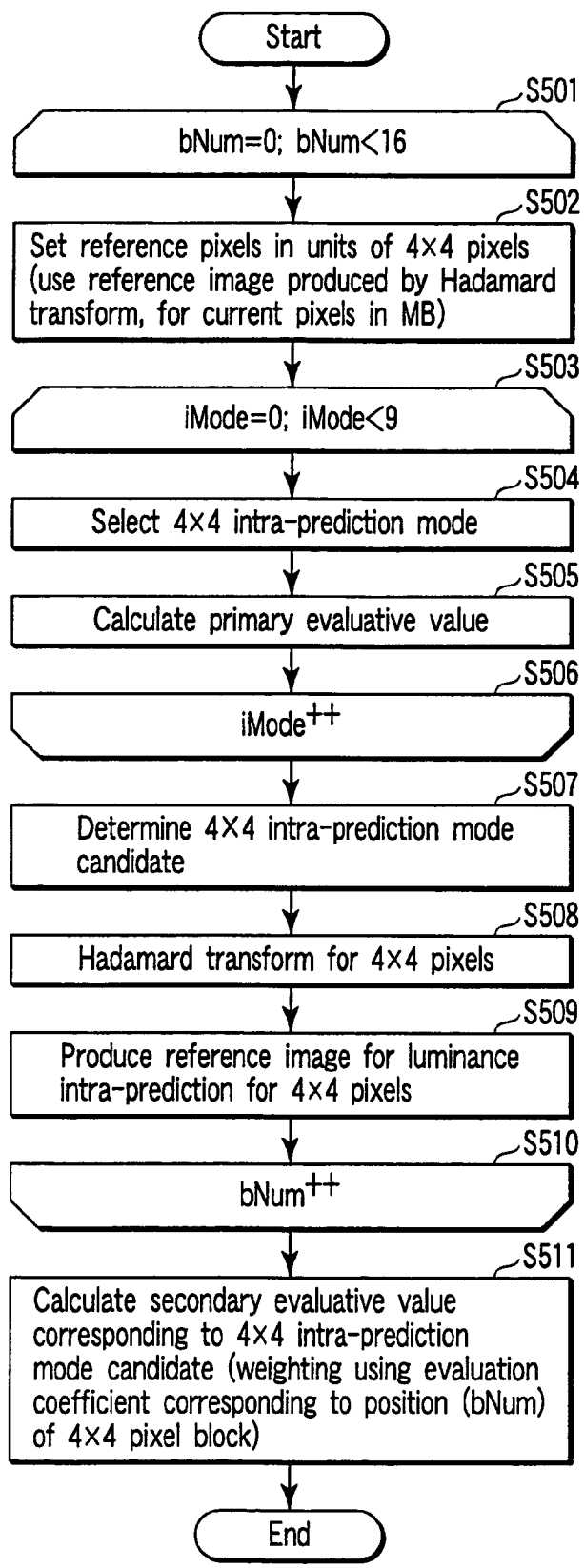
F I G. 11

VIDEO ENCODER AND PORTABLE RADIO TERMINAL DEVICE

CROSS-REFERENCE TO RELATED APPLICATIONS

This application is based upon and claims the benefit of priority from prior Japanese Patent Application No. 2005-084777, filed Mar. 23, 2005, the entire contents of which are incorporated herein by reference.

BACKGROUND OF THE INVENTION

1. Field of the Invention

The present invention relates to a video encoder and a portable radio terminal device using the video encoder.

2. Description of the Related Art

An MPEG system, which is a typical technique for compressively coding motion pictures, carries out coding by combining inter-prediction (motion compensation prediction), intra-prediction, discrete cosine transformation (DCT), and variable length coding. With the intra-prediction, pixel values for a block to be coded are predicted on the basis of pixel values for surrounding reference blocks. A predictive residual is coded which is the difference between each predicted value and the corresponding actual pixel value.

On the other hand, a motion picture coding standard called H. 264/AVC has been established by improving the MPEG system. With H. 264/AVC, for complicated images, intra-prediction is carried out for each block composed of 4×4 pixels (this is called 4×4 intra-prediction). For flat images, intra-prediction is carried out for each macro-block composed of 16×16 pixels (this is called 16×16 intra-prediction). This improves coding efficiency. With the 4×4 intra-prediction, one of nine prediction modes, modes 0 to 8, is selected and determined for each block.

The following technique is disclosed in "Study on Improvement of Efficiency of Intra-Prediction System in H. 264 Coding", KDDI Research Institute, Koichi TAKAGI, et al., ITE Winter Annual Convention 2004): a technique for calculating an evaluative value corresponding to a 4×4 intra-prediction mode in a process for determining a coding prediction mode for each macro-block. With this technique, an original image signal, that is, a motion picture to be coded, is used as a reference image signal to determine the evaluative value. Then, an optimum coding prediction mode is determined on the basis of the evaluative value. Moreover, Koichi TAKAGI, et al. discusses the effects of the amount of codes representing modes at a low rate which effects are observed if a mode evaluative value for a rate distortion optimization (RDO):off mode is used. The following method is disclosed in "Joint Model Reference Encoding Methods and Decoding Concealment Methods JVT-J049 2004-03-02" a method of using the sum of absolute differences (SAD) relating to predictive residuals or the sum of absolute transformed differences (SATD) obtained by subjecting predictive residuals to an Hadamard transformation in order to determine an evaluative value for a prediction mode in H. 264/AVC.

Koichi TAKAGI, et al. uses the original image signal as a reference image signal to determine an evaluative value for a 4×4 intra-prediction mode. This drastically reduces the amount of calculation required to determine a coding prediction mode for each macro-block, compared to a conventional technique of using a local decoding image signal as a reference image signal. However, depending on the position of the 4×4-pixel blocks, there may be large differences in predictive residuals between the use of the original image signal as a reference image signal and the use of the local decoding image signal as a reference image signal. Consequently, the correct evaluative value is not always obtained, thus precluding an appropriate prediction mode from being determined.

BRIEF SUMMARY OF THE INVENTION

It is an object of the present invention to provide a video encoder which is suitable for H. 264/AVC and which enables a coding prediction mode for each macro-block to be appropriately determined using only a small amount of calculation.

According to a first aspect of the present invention, there is provided a video encoder which codes a motion picture signal, the video encoder comprises a primary evaluative value calculating unit which calculates each primary evaluative value of a plurality of primary evaluative values corresponding respectively to a plurality of 4×4-pixel intra-prediction modes with different prediction directions, for each of a plurality of 4×4-pixel blocks, using the motion picture signal as a reference image signal, a secondary evaluative value calculating unit which calculates each of a plurality of secondary evaluative values corresponding respectively to the 4×4 intra-prediction modes, by applying to the primary evaluative value, weight summing which uses an evaluation coefficient corresponding to a position of each of the 4×4-pixel blocks, determining unit which determines a coding prediction mode for each macro-block, using the secondary evaluative values, and coding units which code the motion picture signal in accordance with the coding prediction mode.

According to a second aspect of the present invention, there is provided a video encoder which codes a motion picture signal, the video encoder comprises a converter which subjects a predictive residual signal to a simplified orthogonal transformation to generate a converted image signal, a primary evaluative value calculating unit which calculates each primary evaluative value of a plurality of primary evaluative values corresponding respectively to a plurality of 4×4 intra-prediction modes with different prediction directions, for each of a plurality of 4×4-pixel blocks, using an added image signal obtained by adding the converted image signal to a predicted image signal as a reference image signal, a secondary evaluative value calculating unit which calculates each of a plurality of secondary evaluative values corresponding respectively to the 4×4 intra-prediction modes, by applying to the primary evaluative value, weight summing which uses an evaluation coefficient corresponding to a position of each of the 4×4-pixel blocks, determining unit which determines a coding prediction mode for each macro-block, using the secondary evaluative values, and coding units which code the motion picture signal in accordance with the coding prediction mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a video encoder according to a first embodiment of the present invention;

FIG. 7 is a flowchart illustrating, in detail, a process of determining a 4×4 intra-prediction mode candidate and calculating an evaluative value in step S103 in FIG. 6;

FIG. 11 is a is a flowchart illustrating, in detail, a process of determining a 4×4 intra-prediction mode candidate and calculating an evaluative value according to a second embodiment;

DETAILED DESCRIPTION OF THE INVENTION

Figure 2:
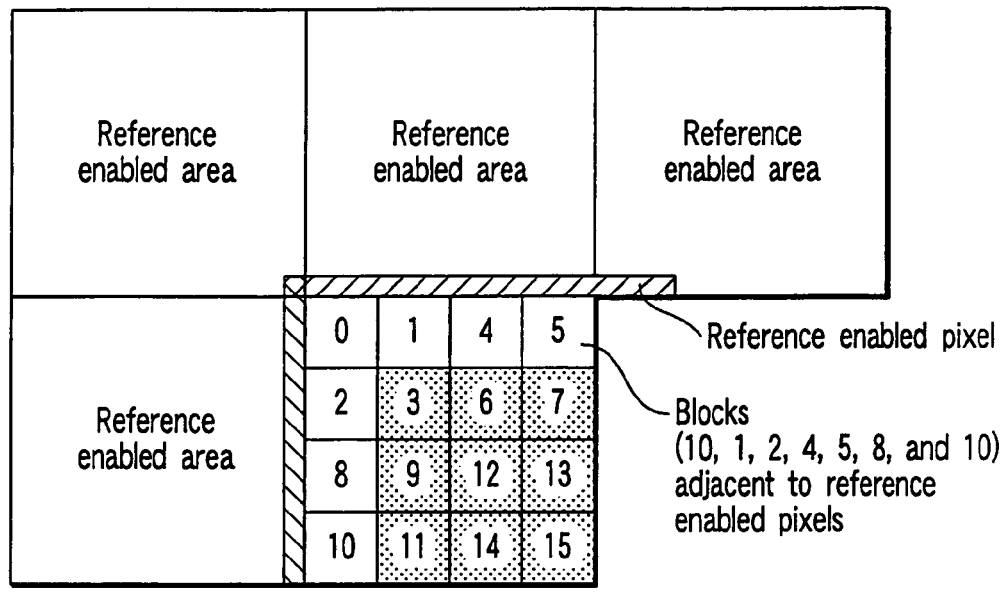
FIG. 2 is a diagram showing the relationship between the pixels in a 4×4-pixel block and reference enabled pixels in a 4×4 intra-prediction mode.

Embodiments of the present invention will be described below with reference to the drawings.

FIG. 1 shows a video encoder according to a first embodiment of the present invention. In this example, a motion picture signal 101 is input to the video encoder, for example, on a frame by frame basis. The motion picture image 101 is input to a subtracter 11. The subtracter 11 generates a predictive residual signal 102 indicating a difference between the motion picture signal 101 and a predicted image signal 112. The predictive residual signal 102 is sent to a discrete cosine transformation (DCT)/quantization unit 12, where it is subjected to DCT and quantization.

As a result, quantized DCT-coefficient information 103 is generated. The quantized DCT-coefficient information 103 is input to an entropy encoder 24 and an inverse-quantization/inverse-discrete cosine transformation (IDCT) unit 15.

The quantized orthogonal transformation-coefficient information 103 is processed by the inverse-quantization/IDCT unit 15, whereby a signal 104 similar to the predictive residual signal 102 is generated. The inverse-quantization/IDCT unit 15 performs inverse-quantization/inverse—discrete cosine transformation that is an inverse process to the process of the orthogonal transformation/DCT unit 12. Then, an adder 16 adds the output signal 104 from the inverse-quantization/IDCT unit 15 to a predicted image signal 112 to generate a local decoding image signal. The local decoding image signal is provided to a reference image memory 18 as a reference image signal 106. Plural frames of the reference image signal are sequentially stored which precede and follow the motion picture signal 101 to be coded.

An intra-predictor 17 performs intra-prediction using a mode determined by a prediction mode determining unit 19, to generate an intra-predicted image signal 105. The intra-predictor 17 is provided with the motion picture signal 101 or a reference image signal 107 read from a reference image memory 18, via a switch 20 controlled by the prediction mode determining unit 19, as a reference image signal 108 for intra-prediction.

A deblocking filter 21 filters the reference image signal 107 read from the reference image memory 18. A reference image signal 109 obtained by the filtering is input to an inter-predictor 22. The inter-predictor 22 detects motion vectors between the filtered reference image signal in a plurality of frames and the motion picture signal 101 and performs inter-prediction (that is, motion compensation prediction based on motion vectors). The inter-predictor 22 thus generates motion vector information 110 and an inter-predicted image signal 111 on a frame by frame basis.

A mode selection switch 23 selects the intra-predicted image signal 105 for an intra-prediction mode and the inter-predicted image signal 111 for an inter-prediction mode (motion compensation prediction mode). A predicted image signal 112 selected by the mode selection switch 23 is input to the subtracter 11 and the adder 16.

An entropy encoder 24 performs entropy coding, for example, arithmetic coding, on the quantized DCT coefficient information output by the quantizer 12 and on coding prediction mode information 113 output by the prediction mode determining unit 19. The entropy encoder 24 thus generates a code sequence 114 of variable length codes corresponding to the information 103, 110, and 113. The variable code sequence 114 is provided to a succeeding multiplexer (not shown) as syntax data. The syntax data is multiplexed to generate a coded bit stream. An output buffer (not shown) smoothes the coded bit stream and transmits the smoothed bit stream to a transmission unit (not shown).

A coding control unit 25 monitors information 115 indicating, for example, the activity of the motion picture signal 101 and the amount of buffer in the output buffer. The coding control unit 25 thus controls quantization parameters (QP) for the quantizer 12 and inverse quantizer 15 as well as the entropy encoder 24 so that the amount of buffer is fixed.

<Prediction Mode Determining Section>

Now, the prediction mode determining unit 19 will be described. The prediction mode determining unit 19 determines whether to select the inter-prediction mode or the intra-prediction mode as a prediction mode. For the intra-prediction mode, the prediction mode determining unit 19 determines whether to select a 4×4 intra-prediction mode or a 16×16 intra-prediction mode. The functions of the prediction mode determining unit 19 are realized by, for example, arithmetic processing executed by a CPU.

Figure 3:
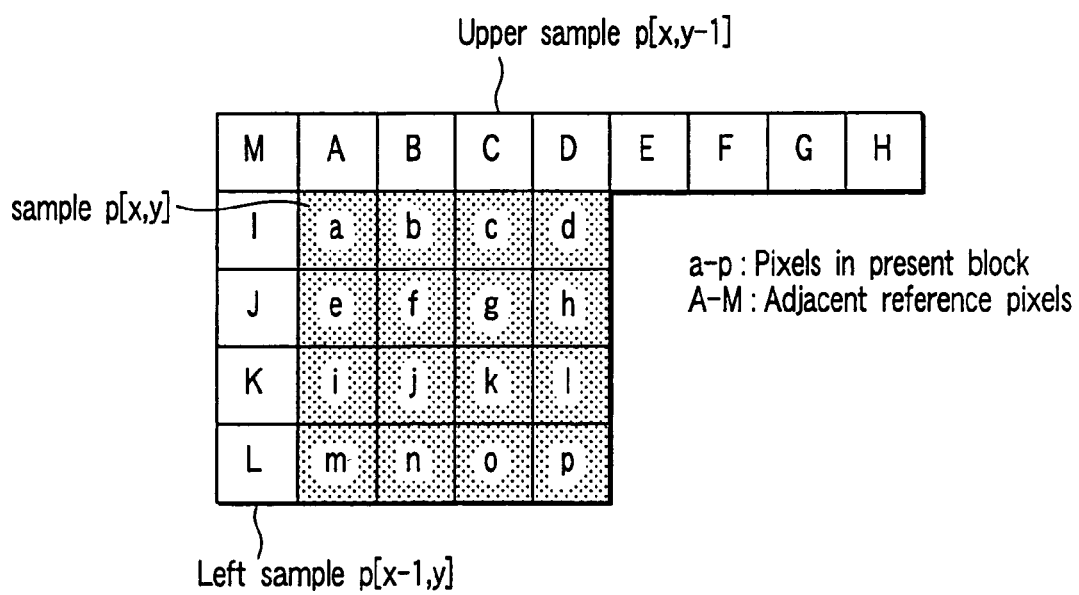
FIG. 3 is a diagram showing the relationship between the pixels in a 4×4-pixel block and reference enabled pixels.

FIG. 2 shows the relationship between reference enabled areas and sixteen 4×4-pixel blocks 0 to 15 which relationship is observed if an original image signal is used as a reference image signal in determining a 4×4 image intra-prediction mode. The blocks 0 to 15 as a whole correspond to a macro-block of 16×16 pixels, and blocks 0, 1, 2, 4, 5, 8, and 10 are adjacent to pixels (reference enabled pixels) in the reference enabled areas in the original image. That is, the block 0 can reference pixels located immediately upper, to its left, and at its upper left. The blocks 1, 4, and 5 can reference pixels located immediately upper. The blocks 2, 8, and 10 can reference pixels located to their left. FIG. 3 shows the relationship between pixels a to p in the current block and the adjacent reference enabled pixels.

On the other hand, the other blocks 3, 6, 7, 9, 11, 12, 13, 14, and 15 are not adjacent to the reference enabled pixels. Accordingly, with these blocks 3, 6, 7, 9, 12, 13, 14, and 15, the level of an error in an evaluative value calculated to determine a prediction mode is higher than in the case in which the local decoding image signal is used as a reference image signal. In particular, the level of the error increases as the block is closer to the lower right one 15.

Figure 4A:
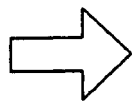
FIGS. 4A and 4B are diagrams showing examples of evaluation coefficients used in the first embodiment.
Figure 4B:
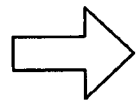

Thus, according to an embodiment of the present invention, as shown in, for example, FIGS. 4A and 4B, the evaluative values are weighted on the basis of an evaluation coefficient corresponding to the position of each of the sixteen 4×4-pixel blocks. In the example shown in FIG. 4A, the blocks are divided into groups in accordance with the number of pixels that can be referenced by each block. A unique evaluation coefficient is specified for each group. Specifically, a larger evaluation coefficient is provided for a group of blocks with a larger number of pixels that can be referenced by them. A smaller evaluation coefficient is provided for a group of blocks with a smaller number of pixels that can be referenced by them. In the example shown in FIG. 4B, the blocks are not divided into groups as shown in FIG. 4A, but evaluation coefficients are individually specified for the respective blocks. In either of FIGS. 4A and 4B, a larger evaluation coefficient is specified for a block with a larger number of pixels that can be referenced by it, that is, a block closer to the upper left one. A smaller evaluation coefficient is specified for a block with a smaller number of pixels that can be referenced by it, that is, a block closer to the lower right one.

Figure 5:
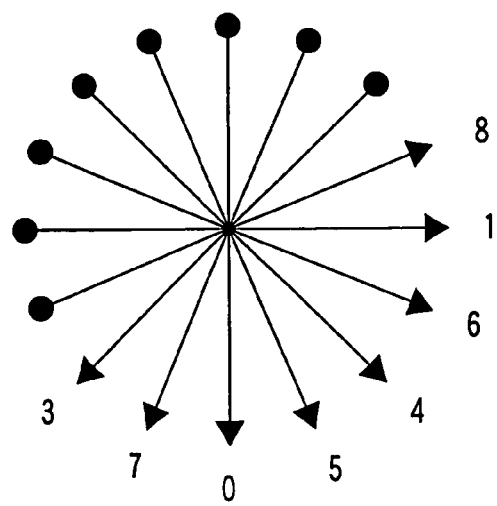
FIG. 5 is a diagram illustrating nine 4×4 intra-prediction mode.

As is well known for H. 264/AVC, there are nine 4×4 intra-prediction modes. Of these modes, the mode 2 is one in which a prediction value is the average of the pixel values of the upper adjacent reference pixels A, B, C, D and left adjacent reference pixels I, J, K, L. All the modes except the mode 2, that is, the modes 0, 1, and 3 to 8, have different prediction directions as shown in FIG. 5.

On the basis of these points, a detailed description will be given of operations of the prediction mode determining unit 19 with reference to FIGS. 6 to 9.

<Signal Processing in Macro-Block Units>

Figure 6:
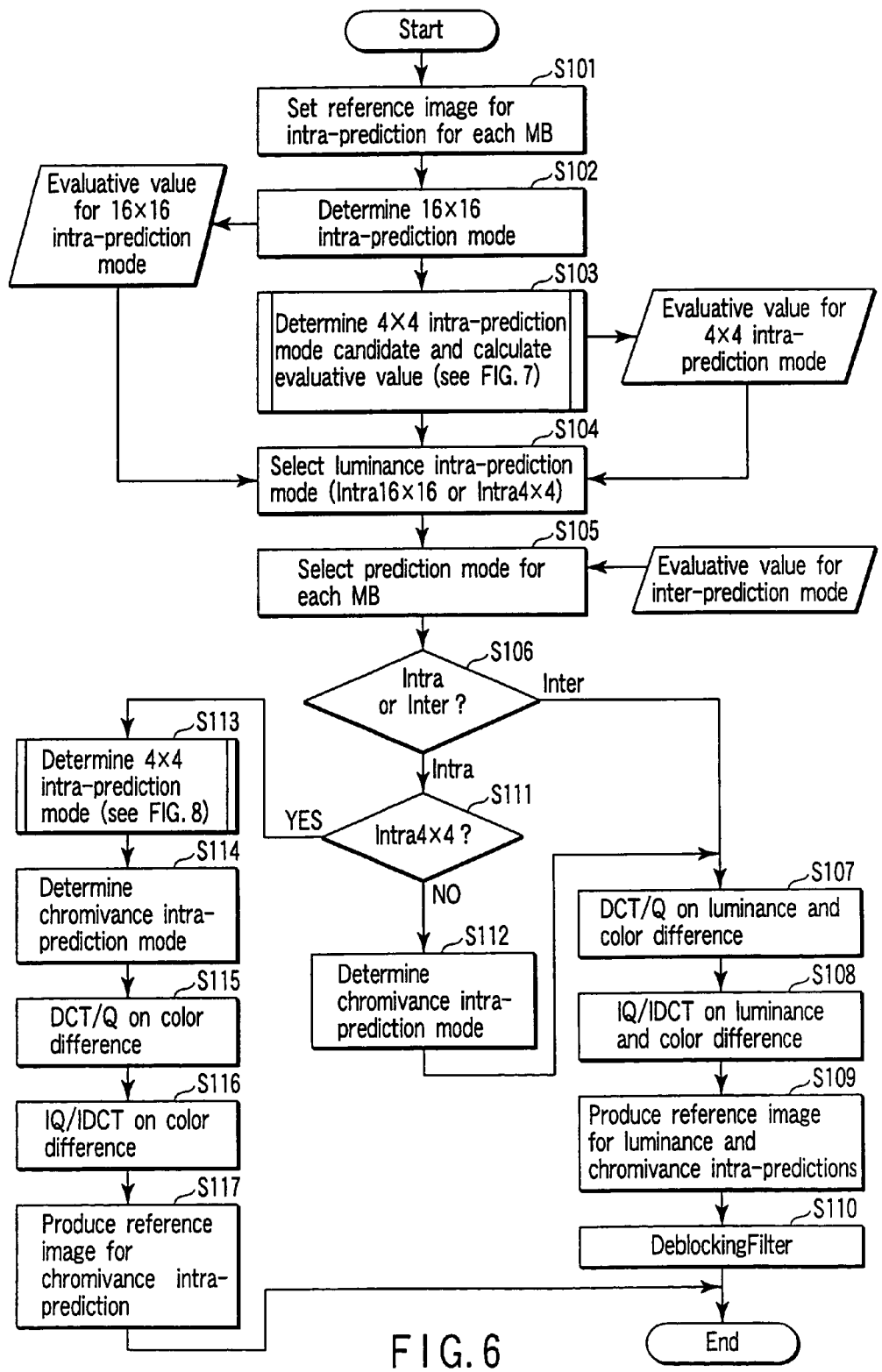
FIG. 6 is a flowchart illustrating signal processing for each macro-block according to the first embodiment.

FIG. 6 schematically shows signal processing including a process of determining a prediction mode for each macro-block (MB). First, in step S101, a reference image for intra-prediction for each macro-block is set. Then, a 16×16 intra-prediction mode is determined (step S102). In this case, an evaluative value J (intra 16×16) for the 16×16 intra-prediction mode determined is calculated using, for example, the method described in "Joint Model Reference Encoding Methods and Decoding Concealment Methods JVT-J049 2004-03-02".

Then, a 4×4 intra-prediction mode candidate is determined using a method described later with reference to FIG. 7. An evaluative value (secondary evaluative value) J (intra 4×4) for the 4×4 intra-prediction mode candidate determined is determined (step S103).

Then, either the 16×16 intra-prediction mode or the 4×4 intra-prediction mode is selected as a luminance intra-prediction mode (step S104). For example, the evaluative value J (intra 16×16) calculated in step S102 is compared with the evaluative value J (intra 4×4) calculated in step S103. If J (intra 16×16)<J (intra 4×4), the 16×16 intra-prediction mode is selected. If J (intra 16×16)>J (intra 4×4), the 4×4 intra-prediction mode is selected.

Then, with reference to the evaluative value J (inter) for the inter-prediction mode, a prediction mode for each macro-block is selected (step S105). The prediction mode selected for each macro-block is judged (step S106). If the inter-prediction mode is selected as a prediction mode for each macro-block, the orthogonal transformation/DCT unit 12 perform DCT and quantization (Q) on the luminance and chrominance of the predictive residual signal 102 (step S107). The inverse-quantization/IDCT unit 15 perform inverse quantization and inverse DCT on the luminance and chrominance (step S108) to generate a signal 104. Then, the mode selection switch 23 selects the inter-predicted image signal 111 outputted from the inter-predictor 22, as predicted image signal 112. The adder 16 adds the signal 104 to the predicted image signal 112 to produce a reference image signal 106 for luminance and chrominance intra-prediction (step S110). Subsequently, the reference image signal 106 is written to the reference image memory 18 and then filtered by the deblocking filter 19 to generate a reference image signal 109 for inter-prediction.

On the other hand, in step S105, if the intra-prediction mode is selected as a prediction mode for each macro-block, the device checks whether or not a 4×4 intra-prediction mode has been selected (step S111). If no 4×4 intra-prediction mode has been selected, a chrominance intra-prediction mode is determined (step S112). The process then transfers to step S107 and step S108. Then, the mode selection switch 23 selects the intra-predicted image signal 105 outputted from the intra-predictor 17, as predicted image signal 112. The adder 16 adds the signal 104 to the predicted image signal 112 to produce a reference image signal 106 for luminance and chrominance intra-prediction (step S110). Subsequently, the reference image signal 106 is written to the reference image memory 18 and then filtered by the deblocking filter 19 to generate a reference image signal 109 for inter-prediction. If a 4×4 intra-prediction mode has been selected, it is determined using a method described later with reference to FIG. 8 (step S113).

Then, a chrominance intra-prediction mode is determined (step S114). Subsequently, a procedure similar to steps S107 to S109 is used to perform DCT and quantization on chrominance (step S115) and then inverse quantization and inverse DCT on chrominance (step S116) to produce a reference image signal 106 for chrominance intra-prediction.

<Determination of 4×4 Intra-Prediction Mode Candidate>

Now, with reference to FIG. 7, description will be given of processing in step S103, shown in FIG. 6. First, in step S201, a block number (bNum) is set at bNum=0. Reference pixels in units of 4×4-pixels are set on the motion picture signal 101 (original image signal) in association with the block bNum=0 (step S202). Then, a number iMode for the nine 4×4 intra-prediction modes is set at iMode=0 (step S203). A 4×4 intra-prediction mode is then selected (step S204). An evaluative value (primary evaluative value) for the selected 4×4 intra-prediction mode is calculated in accordance with the method described by Koichi TAKAGI, et al., using, for example, Equation (1) or (2) (step S205).

$$J = SAD + \lambda * R \quad (1)$$

$$J = SATD + \lambda * R \quad (2)$$

where J represents a primary evaluative value, and SAD represents the sum of absolute differences resulting from the 4×4 intra-prediction mode. Further, λ represents a constant, and R represents the amount of codes indicating the coding prediction mode. In general, λ is a function for a quantization parameter QP. SATD represents the sum of absolute transformed differences obtained by subjecting predictive residuals resulting from the 4×4 intra-prediction mode to an Hadamard transformation. SAD and SATD are described by Koichi TAKAGI, et al. in detail.

Subsequently, iMode is incremented by one (step S206). The processing in steps S204 and S205 is repeated until iMode=8. Of the 4×4 intra-prediction modes with iMode=0 to 8, one with the minimum evaluative value calculated in step S205 is determined to be a candidate for the 4×4 intra-prediction mode (step S207). Subsequently, bNum is incremented by one (step S208). The processing in steps S202 to S207 is repeated until bNum=15. Thus, a candidate for the 4×4 intra-prediction mode is determined for all the 4×4-pixel blocks.

Then, an evaluative value (secondary evaluative value) is calculated for the 4×4 intra-prediction mode candidate for each block obtained as described above (step S209). In calculation of a secondary evaluative value, the primary evaluative value calculated in step S205 for the 4×4 intra-prediction mode candidate is weighted using an evaluation coefficient such as those shown in FIG. 4A or 4B and corresponding to bNum, that is, the positions of the 4×4-pixel blocks. The calculation of the secondary evaluative value is expressed by Equation (3).

$$E = \sum_{i=0}^{15} (Ji \times wi) \quad (3)$$

where E represents a secondary evaluative value, and Ji represents a primary evaluative value for an i-th 4×4-pixel block. Further, wi represents an evaluation coefficient (weighting coefficient) corresponding to the position of the i-th 4×4-pixel block. For example, basically, a smaller evaluative coefficient is specified for a 4×4-pixel block closer to the lower right one. Accordingly, the secondary evaluative values compensate for errors resulting from the different positions of the 4×4-pixel blocks. Therefore, the secondary evaluative values are more reliable.

<Determination of 4×4 Intra-Prediction Mode>

Figure 8:
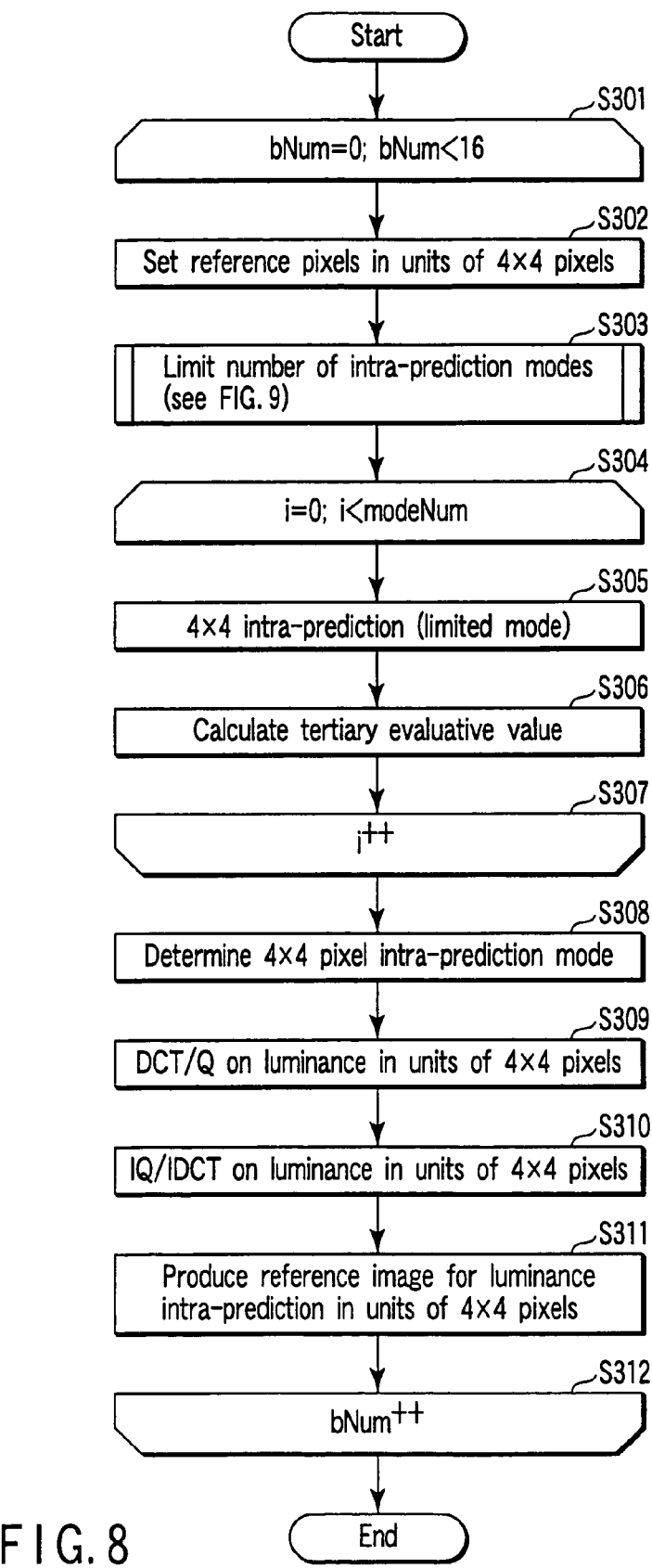
FIG. 8 is a flowchart illustrating, in detail, a process of determining a 4×4 intra-prediction mode candidate in step S113 in FIG. 6.

Now, with reference to FIG. 8, description will be given of the processing in step S113 in FIG. 6. First, reference pixels in units of the 4×4-pixel block are set on the reference image signal 107 in association with the block bNum=0 (step S302). Then, with reference to the 4×4 intra-prediction mode candidate obtained in steps S201 to S208 in FIG. 7, the number of 4×4 intra-prediction modes is limited using a method described later with reference to FIG. 9 (step S303). Specifically, the 4×4 intra-prediction modes are limited to the mode candidate and the adjacent prediction modes (referred to as the adjacent modes below). For example, in FIG. 5, if the 4×4 intra-prediction mode candidate is the mode 6, the adjacent modes correspond to the modes 1 and 4.

Then, i=0 is set (step S304). The modes selected in step S303 are used to perform a 4×4 intra-prediction (step S305). In step S305, the switch 20 is shifted so that the lower switch in FIG. 1 is activated. As a result, the local decoding image signal 107 read from the reference image memory 18 is used as a reference image signal. For the 4×4 intra-prediction mode used in step S305, an evaluative value (tertiary evaluative value) is calculated using, for example, Equation (1) or (2) (step S306). Subsequently, i is incremented by one (step S307).

The processing in steps S305 and S306 is repeated until reaches the limited number modeNum. That is, the processing in steps S305 and S306 is repeated until I reaches i=(modeNum-1).

Once the processing in steps S304 to S307 is finished, a 4×4 intra-prediction mode for the block bNum=0 is finally determined in which the tertiary evaluative value calculated in step S306 is minimized (step S308). Then, DCT and quantization are performed on luminance in units of 4×4-pixels (step S309) and then inverse quantization and inverse DCT are performed on luminance in units of 4×4-pixels (step S310) to produce a reference image signal for luminance intra-prediction in units of 4×4-pixels (step S311). Subsequently, bNum is incremented by one (step S312). The processing in steps S302 to S312 is repeated until bNum=15. Finally, a 4×4 intra-prediction mode is determined for all the 4×4-pixel blocks.

<Limiting Number of 4×4 Intra-Prediction Modes>

Figure 9:
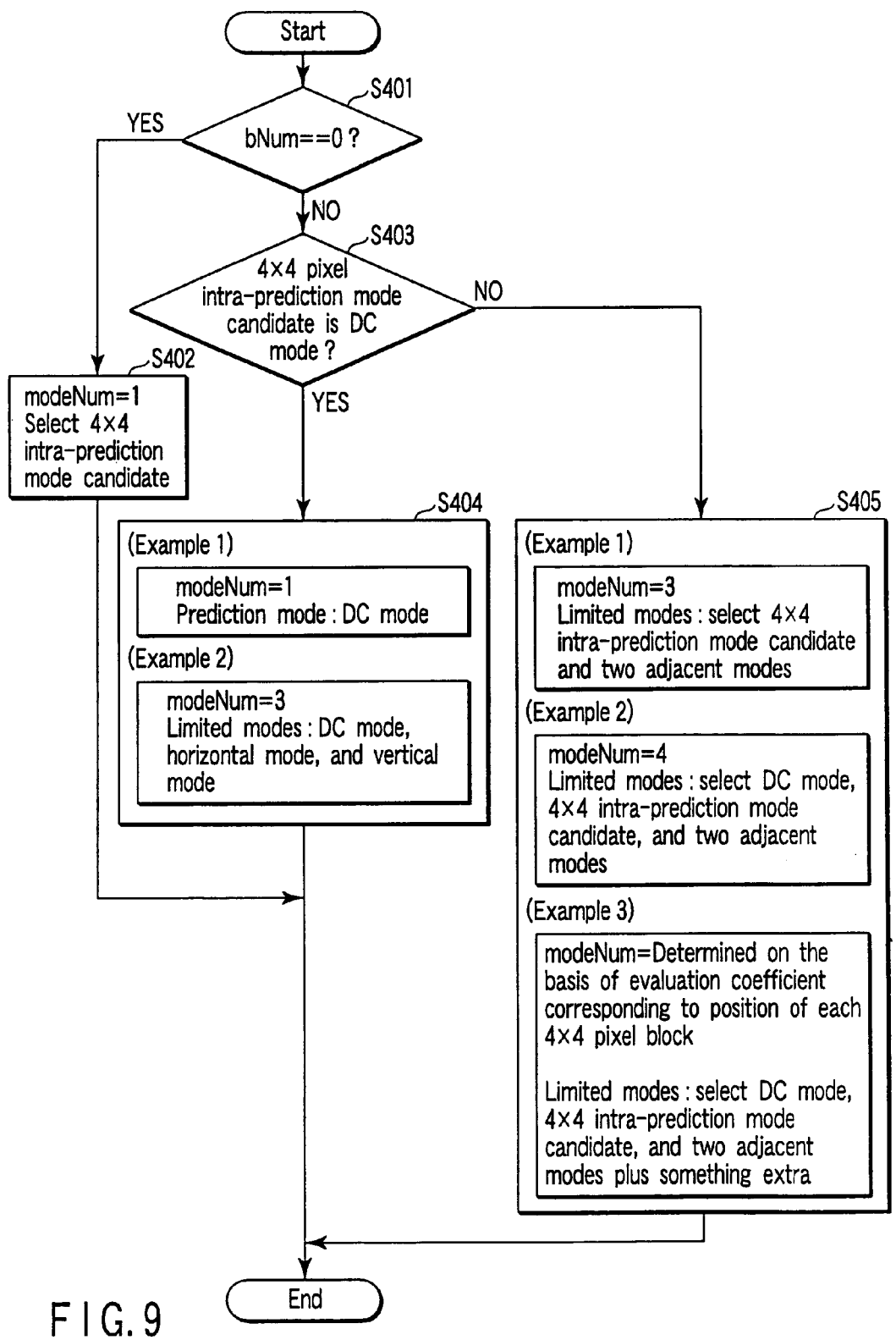
FIG. 9 is a flowchart illustrating, in detail, a process of limiting the number of intra-prediction modes in step S303 in FIG. 8.

Now, with reference to FIG. 9, description will be given of the processing in step S303 in FIG. 8. First, the device determines whether or not the block number bNum of the 4×4-pixel block is 0 (step S401). If the 4×4-pixel block has the block number bNUm0, the limited number modeNum is set at 1. The 4×4 intra-prediction mode candidate is determined to be the final pixel intra-prediction mode (step S402).

If the block number bNum is not 0, the device determines whether or not the 4×4 intra-prediction mode is a DC mode (step S403). If the 4×4 intra-prediction mode is the DC mode, the process advances to step S404. In step S404, for example, modeNum is set at 1 to determine the DC mode to be a limited mode as shown in (Example 1). Alternatively, modeNum is set at 3 to determine the DC mode, a horizontal mode, and a vertical mode to be limited modes as shown in (Example 2).

In step S403, if the 4×4 intra-prediction mode candidate is not the DC mode, the process advances to step S405. In step S405, for example, modeNum is set at 3 to determine the 4×4 intra-prediction mode candidate and the two adjacent modes described in FIG. 5 to be limited modes as shown in (Example 1). Alternatively, modeNum is set at 4 to determine the DC mode, 4×4 intra-prediction mode candidate, and two adjacent modes to be limited modes as shown in (Example 2). Alternatively, as shown in (Example 3), modeNum is determined in accordance with the evaluation coefficient corresponding to the position of the 4×4-pixel block. At least the DC mode, 4×4 intra-prediction mode candidate, and two adjacent modes are then determined to be limited modes. Other modes are additionally determined to be limited modes in accordance with modeNum.

As described above, in the first embodiment, the original image signal, that is, the motion picture signal to be coded, is used as a reference image signal to calculate, for each block, a primary evaluative value corresponding to each 4×4 intra-prediction mode. A secondary evaluative value is then calculated for each macro-block by utilizing weighted summing that uses an evaluation coefficient corresponding to the position of the block. The secondary evaluative value is used to determine a coding prediction mode for each macro-block. This makes it possible to determine the mode with only a small amount of calculation.

Moreover, on the basis of 4×4 intra-prediction modes selected with reference to a 4×4 intra-prediction mode candidate obtained in accordance with the primary evaluative values, a coding 4×4 intra-prediction mode can be appropriately determined using a local decoding image signal as a reference image signal.

Figure 10:
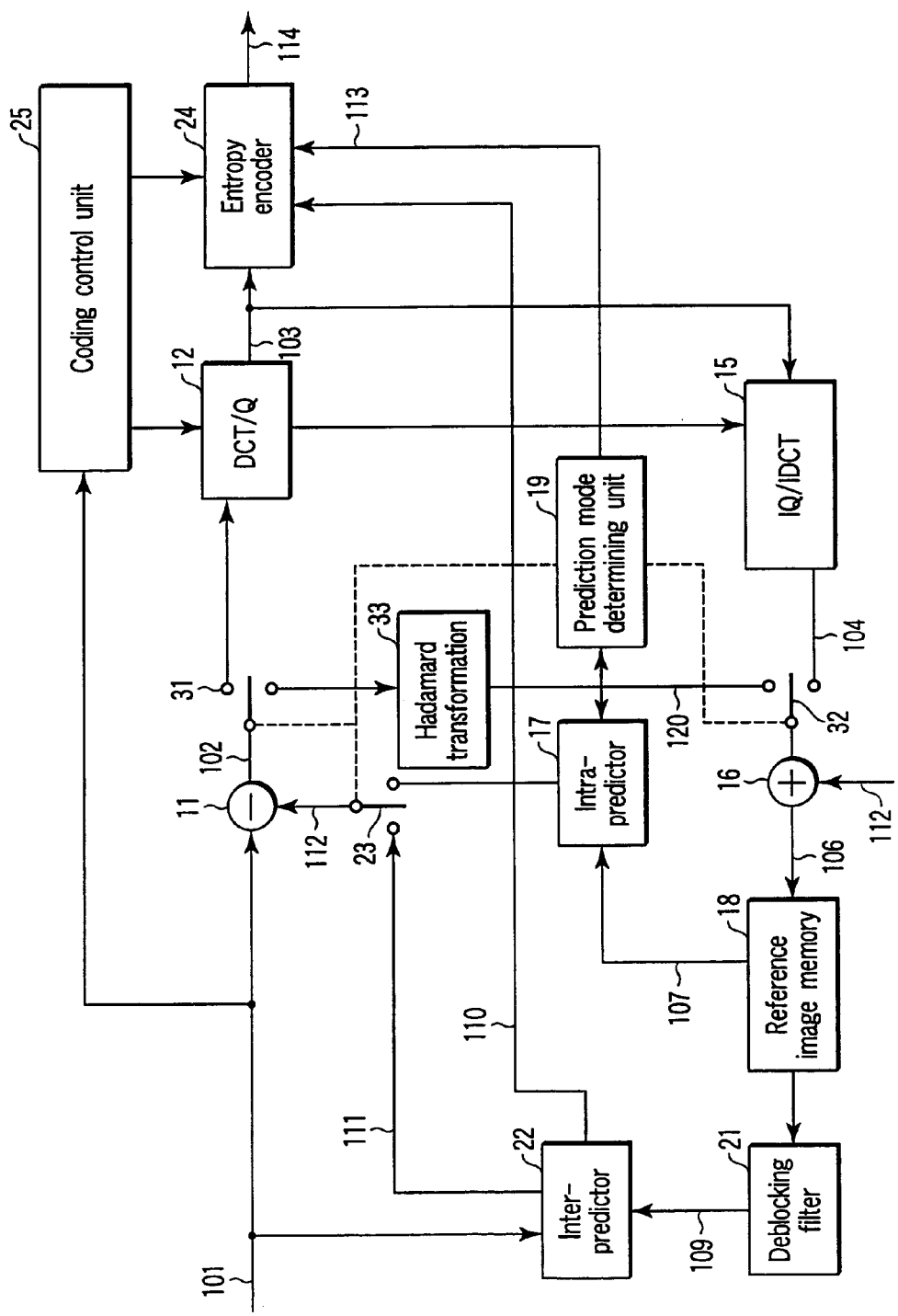
FIG. 10 is a block diagram showing a video encoder according to a second embodiment of the present invention.

Now, a second embodiment of the present invention will be described. FIG. 10 shows a video encoder according to the second embodiment of the present invention. Description will be given of differences from the video encoder according to the first embodiment shown in FIG. 1. In the video encoder in FIG. 10, the switch 20 in FIG. 1 is omitted and a switch 31, a switch 32, and an Hadamard transformation unit 33 are added to the device.

The switch 31 normally supplies the DCT unit 12 with the predictive residual signal 102 output by the subtracter 11. When the prediction mode determining unit 19 determines a 4×4 intra-prediction mode candidate, the switch 31 supplies the predictive residual signal 102 to the Hadamard transformation unit 33. The switch 32 normally supplies the adder 16 with the signal 104 output by the IDCT unit 15. When the prediction mode determining unit 19 determines a 4×4 intra-prediction mode candidate, the switch 32 supplies the adder 16 with a converted image signal from the Hadamard transformation unit 33.

The Hadamard transformation unit 33 performs an Hadamard transformation, which is a simplified orthogonal transformation, on the predictive residual signal to generate a converted image signal. The Hadamard transformation is a simplified orthogonal transformation realized only by additions and subtractions. The amount of calculation required for the Hadamard transformation is significantly smaller than that required for DCT/Q and IQ/IDCT. The simplified orthogonal transformation means an orthogonal transformation requiring a smaller amount of calculation than DCT/Q and IQ/IDCT. The simplified orthogonal transformation is not particularly limited to the Hadamard transformation. When the prediction mode determining unit 19 determines a 4×4 intra-prediction mode candidate, the converted image signal 120 output by the Hadamard transformation unit 33 is supplied to the adder 16 by energizing the switch 32. The adder 16 adds the converted image signal 120 to the predicted image signal 105 from the intra-predictor 17 to generate an added image signal. The added image signal is stored in the reference image memory 18 as the reference image signal 106.

Signal processing for each macro-block according to the second embodiment is basically similar to that according to the first embodiment as shown in FIG. 6. However, a process for <determining a 4×4 intra-prediction mode candidate> according to the second embodiment is different from that according to the first embodiment.

Thus, with reference to FIG. 11, description will be given of the processing in step S103 in FIG. 6 according to the second embodiment. First, in step S501, the block number (bNum) is set at 0. In FIG. 10, the switch 31 allows the predictive residual signal 102 to be supplied to the Hadamard transformation unit 33. The switch 32 allows the converted image signal 120 from the Hadamard transformation unit 33 to be supplied to the adder 16. The added image signal is thus used as a reference image signal (quasi reference image signal). Reference pixels in units of 4×4 pixels are set on the quasi reference image signal in association with the block bNum=0 (step S502). Then, the number iMode for the nine 4×4 intra-prediction modes is set at iMode=0 (step S503). A 4×4 intra-prediction mode is then selected (step S504).

Then, an evaluative value for the selected 4×4 intra-prediction mode is calculated, for example, using Equation (1) or (2) (step S505).

Subsequently, iMode is incremented by one (step S506). The processing in steps S504 and S505 is repeated until iMode=8. Of the 4×4 intra-prediction modes with iMode=0 to 8, one with the minimum evaluative value calculated in step S505 is determined to be a candidate for the 4×4 intra-prediction mode (step S507).

Then, the Hadamard transformation unit 33 performs an Hadamard transformation in units of 4×4 pixels (step S508) to produce a quasi reference image for luminance intra-prediction in units of 4×4 pixels (step S509). Subsequently, bNum is incremented by one (step S510). The processing in steps S502 to S509 is repeated until bNum=15. Thus, a candidate for the 4×4 intra-prediction mode is determined for all the 4×4-pixel blocks.

Then, an evaluative value is recalculated for the 4×4 intra-prediction mode candidate for each block obtained as described above (step S511). In the recalculation, the evaluative values calculated in step S505 for the 4×4 intra-prediction mode candidate are weighted using evaluation coefficients such as those shown in FIG. 4A or 4B and corresponding to bNum, that is, the positions of the 4×4-pixel blocks.

As described above, according to the second embodiment, an image signal generated using a simplified orthogonal transformation such as the Hadamard transformation is used as a reference image signal to calculate, for each block, a primary evaluative value corresponding to each 4×4 intra-prediction mode. Then, a secondary evaluative value is calculated for each macro-block by utilizing weighted summing that uses an evaluation coefficient corresponding to the position of the block. Subsequently, as in the case of the first embodiment, the secondary evaluative value is used to determine a coding prediction mode for each macro-block. This makes it possible to determine the mode with only a small amount of calculation.

Figure 12:
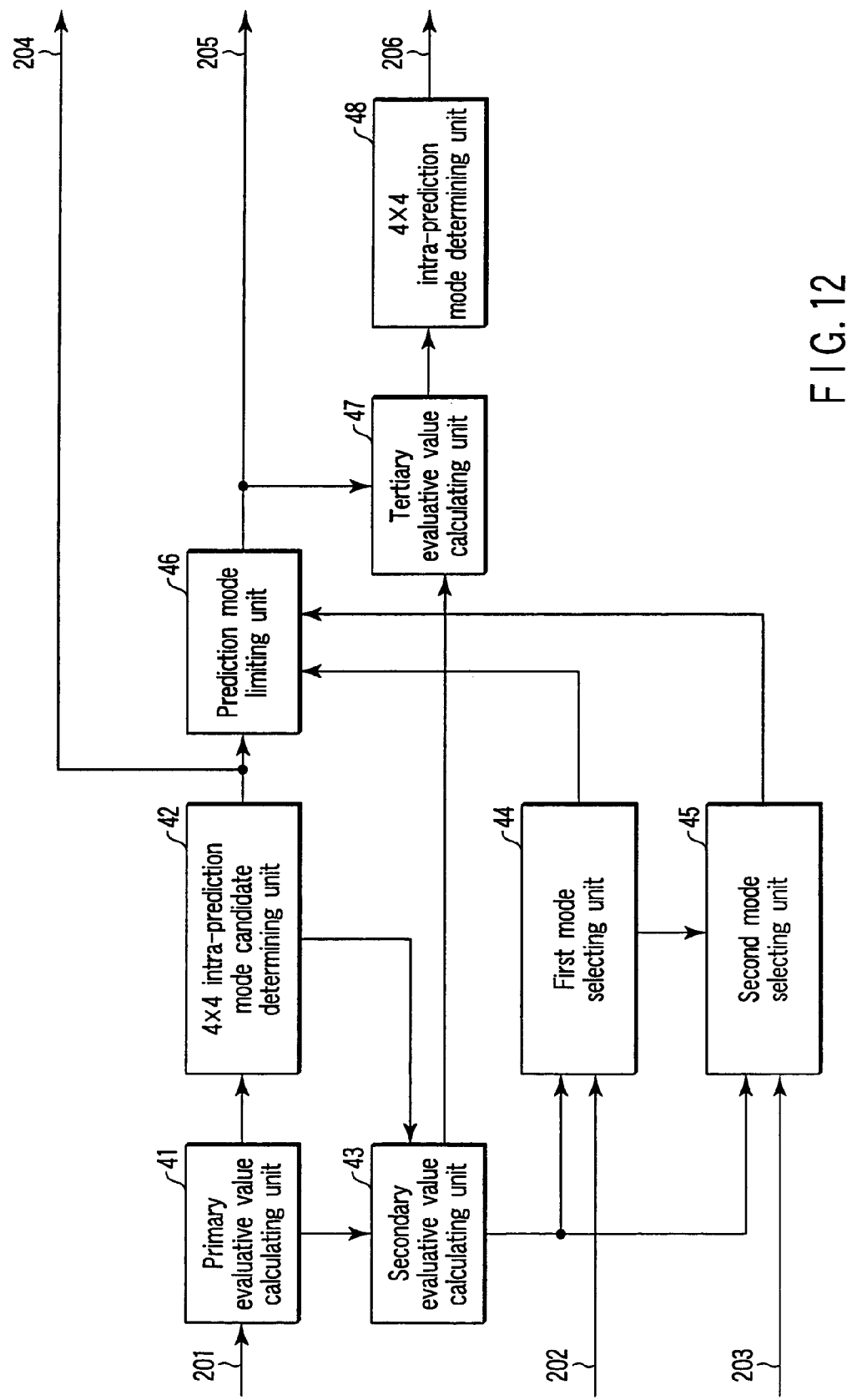
FIG. 12 is a block diagram showing functions relating to the determination of a 4×4 intra-prediction mode according to the embodiment of the present invention.

FIG. 12 is a block diagram illustrating functions of the prediction mode determining unit 19 in FIG. 1 which relate to determination of a 4×4 intra-prediction mode candidate. A primary evaluative value calculating unit 41 performs processing in steps S203 to S206 in FIG. 7 or processing in steps S503 to S506 in FIG. 11. That is, the original image signal 101 or the added image signal obtained using the converted image signal 120 and predicted image signal 105 is used as a reference image signal 201 used to determine a 4×4 intra-prediction mode. A primary evaluative value corresponding to each of the prediction modes 0 to 8 is calculated using, for example, Equation (1) or (2).

A 4×4 intra-prediction mode candidate determining unit 42 performs the processing in steps S201 to S207 in FIG. 7 or processing in steps S501 to S507 in FIG. 11. A 4×4 intra-prediction mode candidate is determined for each of the sixteen 4×4-pixel blocks in accordance with a primary evaluative value calculated by the primary evaluative value calculating unit 41 by executing the processing in steps S203 to S206 in FIG. 7 or processing in steps S503 to S506 in FIG. 11. The 4×4 intra-prediction mode candidate determined is provided to a secondary evaluative value calculating unit 43 and a prediction mode limiting unit 44.

The secondary evaluative value calculating unit 43 performs the processing in step S209 in FIG. 7 or processing in step S511 in FIG. 11. Specifically, the secondary evaluative value calculating unit 43 performs a recalculation on the primary evaluative value calculated in step S205 in FIG. 7 or processing in step S505 in FIG. 11, in accordance with, for example, Equation (3). Thus, a secondary evaluative value is determined for the 4×4 intra-prediction mode candidate determined in step S207 in FIG. 7 or processing in step S507 in FIG. 11.

A coding prediction mode for each macro-block is determined by a first mode selecting unit 44, a second mode selecting unit 45, a prediction mode limiting unit 46, a tertiary evaluative value calculating unit 47, and a 4×4 intra-prediction mode determining unit 48. The first mode selecting unit 44 executes the processing in step S104 in FIG. 6. Specifically, the first mode selecting unit 44 compares the secondary evaluative value for the 4×4 intra-prediction mode candidate with an evaluative value 202 for a 16×16 intra-prediction mode candidate. The first mode selecting unit 44 thus selects either the 4×4 intra-prediction mode or the 16×16 intra-prediction mode as a luminance intra-prediction mode. The second mode selecting unit 45 executes the processing in step S105 in FIG. 6. Specifically, the second mode selecting unit 45 compares the secondary evaluative value for the 4×4 intra-prediction mode candidate with an evaluative value 203 for the inter-prediction mode. The second mode selecting unit 45 thus selects either the intra-prediction mode or the inter-prediction mode as a prediction mode for each macro-block.

The final 4×4 intra-prediction mode is determined by the prediction mode limiting unit 46, tertiary evaluative value calculating unit 47, and 4×4 intra-prediction mode determining unit 48 by executing the processing shown in FIG. 7 or FIG. 11. First, the prediction mode limiting unit 46 executes the processing in step S303 in FIG. 8 in accordance with a procedure such as the one shown in FIG. 9. The prediction mode limiting unit 46 then limits the number of prediction modes 0 to 8 to at least one with reference to the 4×4 intra-prediction mode candidate. If the prediction mode limiting unit 46 has limited the number of prediction modes to one, that mode is output as a final 4×4 intra-prediction mode 205.

If the prediction mode limiting unit 44 has limited the number of prediction modes to at least two, the tertiary evaluative value calculating unit 47 uses a local decoding image signal as a reference image signal to produce a tertiary evaluative value corresponding to each of the selected modes. The 4×4 intra-prediction mode determining unit 48 determines one of the 4×4 intra-prediction modes to be a coding prediction mode 206 in accordance with the tertiary evaluative value. The candidate determined by the 4×4 intra-prediction mode candidate determining unit 42 may be used as a final 4×4 intra-prediction mode 204.

Figure 13:
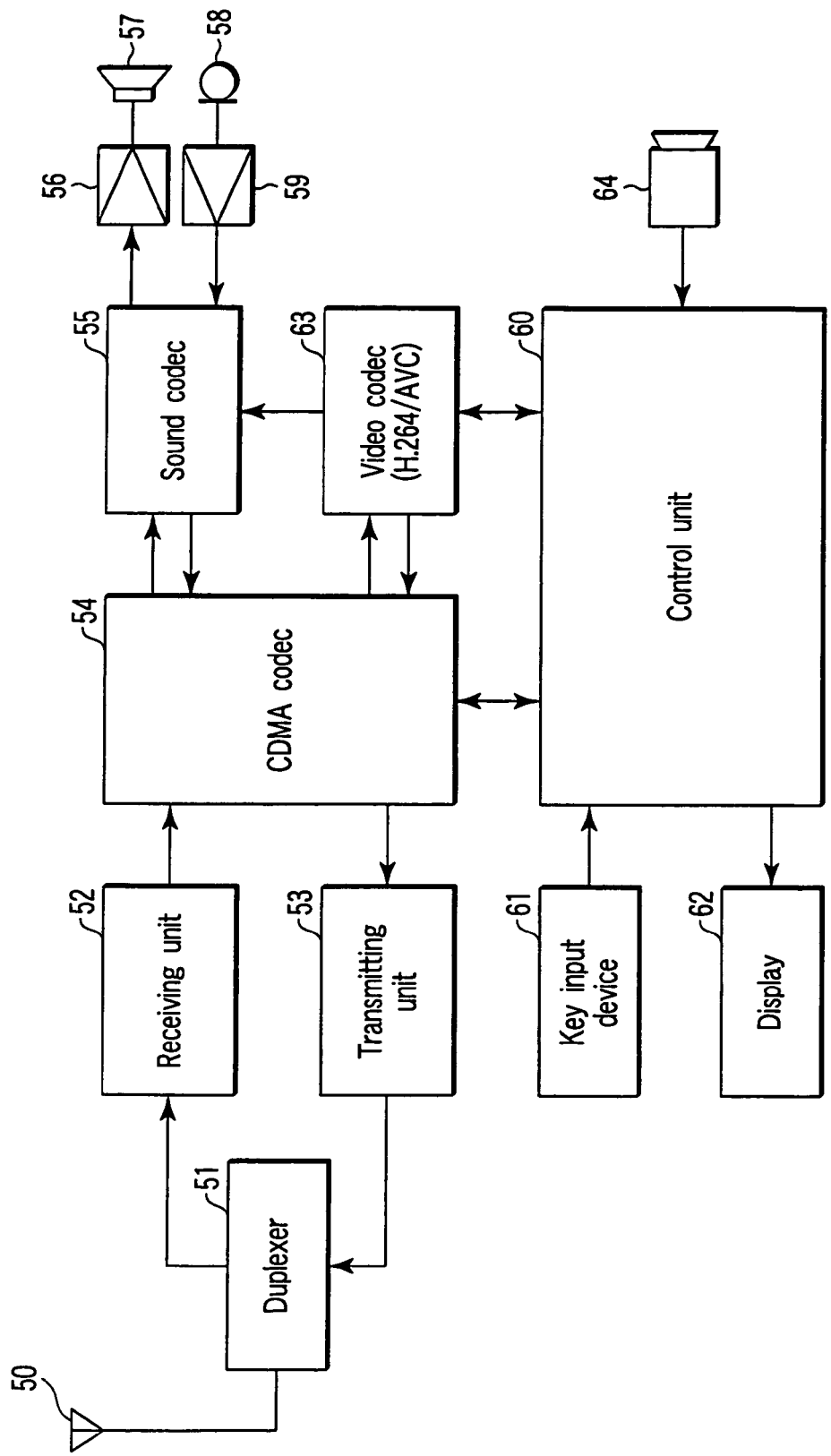
FIG. 13 is a block diagram showing an example of a portable radio terminal device including a video encoder according to the embodiment of the present invention.

FIG. 13 shows a portable radio terminal device such as a cellular phone which is an applied example of the present invention. Upon reception, an antenna 50 receives a radio frequency (RF) signal transmitted by a base station included in a carrier communication network (not shown). The received signal is input to a receiving unit 52 via a duplexer 51. The receiving unit 51 performs processing such as amplification, frequency conversion (down conversion), and analog to digital conversion on the received signal to generate an intermediate frequency (IF) signal. A received baseband signal is input to a code division multiple access (CDMA) codec 54. The code division multiple access codec 54 subjects the signal to orthogonal demodulation and despreading to obtain received data. If the received RF signal is a voice signal, a voice codec 55 decompresses the received data in accordance with a predetermined voice decoding system. The voice codex 55 further performs a digital to analog conversion to decode the data into an analog signal. The analog signal is supplied to a speaker 37 via a power amplifier 586. The speaker 37 then outputs a sound.

Upon transmission, a microphone 58 detects a sound made by a user as a sound signal. A preamplifier 59 amplifies the sound signal. Then, the sound codec 55 digitalizes the amplified signal and compresses the digitalized signal in accordance with a predetermined sound coding system to obtain transmitted sound data. The transmitted sound data is input to the CDMA codec 54. The CDMA codec 54 then subjects the data to spreading and orthogonal modulation. A transmitting unit 33 then subjects the orthogonal modulated signal thus obtained to a digital-analog conversion and a frequency conversion (up convert) to convert it into an RF signal. The power amplifier then amplifies the RF signal and supplies the amplified signal to the antenna 50 via the duplexer 51. As a result, the RF signal is radiated to the air as an electric wave and transmitted to the base station.

A control unit 60 consisting of a central processing unit (CPU) controls each unit, performs various mathematical operations, and processes video and text information. The control unit 60 connects not only to the CDMA codec 54 and sound codec 55 but also to a key input unit 61, a display 62, a video codec 63, and a camera (imaging device) 64. Each unit is supplied with power from a battery (not shown) under the control of the control unit 60.

The video codec 63 conforms to H. 264/AVC and includes the video encoder shown in FIG. 1 or FIG. 10. and a video decoder not shown in the drawings. A video encoder codes a motion picture signal obtained using, for example, the camera 64 to generate a coded bit stream. The coded bit stream is supplied to the CDMA codec 54 under the control of the control unit 60. The coded bit stream is then transmitted to the base station via the transmitting unit 53, duplexer 51, and antenna 50. In this case, by causing the control unit 60 to process the motion picture signal obtained using the camera 64 and to supply the processed signal to the display 62, it is possible to monitor the photographed image.

If the received data is a compressed motion picture signal, the CDMA codec 54 converts the received data into a coded bit stream. The coded bit stream is input to the video decoder. The video decoder decodes the coded bit stream to generate a motion picture signal. The motion picture signal generated by the video decoder is supplied to the display 62 under the control of the control unit 60. Consequently, the display 62 shows the signal as an image.

The CPU of the control unit 60 uses software to execute a part of the processing required for the video encoder (for example, determination of a prediction mode) and a part of the processing required for the video decoder. The video encoder according to the embodiments of the present invention drastically reduces the throughput required to determine an intra-prediction mode as previously described. This in turn reduces loads on the video codec 63 and control unit 60. As a result, it is possible to contribute to reducing the size and power consumption of a radio terminal device such as the one shown in FIG. 13.

According to the present invention, a motion picture signal or an image signal obtained by a simplified orthogonal transformation is used as a reference image signal to calculate, for each block, a primary evaluative value corresponding to each 4×4 intra-prediction mode. Then, a secondary evaluative value is calculated for each macro-block by utilizing weighted summing which uses an evaluation coefficient corresponding to the position of the block. By using the secondary evaluative values to determine a coding prediction mode for each macro-block, it is possible to determine the mode with only a small amount of calculation.

Moreover, on the basis of a 4×4 intra-prediction mode selected with reference to a 4×4 intra-prediction mode candidate obtained in accordance with the primary evaluative values, a coding 4×4 intra-prediction mode can be appropriately determined using a local decoding image signal as a reference image signal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video encoder which codes a motion picture signal, the video encoder comprising:
    means for calculating each primary evaluative value of a plurality of primary evaluative values corresponding respectively to a plurality of 4×4 intra-prediction modes with different prediction directions, for each of sixteen 4×4-pixel blocks included in each of a plurality of macro-blocks, each macro-block comprising sixteen 4×4-pixel blocks, using the motion picture signal as a reference image signal;
    means for determining a 4×4 intra-prediction mode candidate in accordance with the primary evaluative values;
    means for calculating each of a plurality of secondary evaluative values corresponding respectively to 4×4 intra-prediction mode candidates for each macro-block, by applying to the primary evaluative values for the 4×4 intra-prediction mode candidates, weight summing which uses evaluation coefficients corresponding to positions of each of the 4×4-pixel blocks in the macro-block;
    means for determining a coding prediction mode for each macro-block, using the secondary evaluative values; and
    means for coding the motion picture signal in accordance with the coding prediction mode.

2. The video encoder according to claim 1, wherein the means for calculating the primary evaluative value calculates the primary evaluative value using the following equation:

$$J=SAD+\lambda*R$$

where J is the primary evaluative value, SAD represents a sum of absolute differences resulting from a 4×4 intra-prediction mode, λ represents a constant, and R represents an amount of codes representing the coding prediction mode.

3. The video encoder according to claim 1, wherein the means for calculating the primary evaluative value calculates the primary evaluative value using the following equation:

$$J=SATD+\lambda*R$$

where J is the primary evaluative value, SATD represents a sum of absolute transformed differences obtained by subjecting predictive residuals resulting from a 4×4 intra-prediction mode to a Hadamard transformation, λ represents a constant, and R represents an amount of codes representing the coding prediction mode.

4. The video encoder according to claim 1, wherein the means for calculating the secondary evaluative value calculates the secondary evaluative value using the following equation:

$$E = \sum_{i=0}^{15} (Ji \times wi)$$

where E represents the secondary evaluative value, i represents a 4×4-pixel block number, Ji represents a corresponding primary evaluative value, and wi represents a corresponding evaluation coefficient.

5. The video encoder according to claim 1, wherein for the plurality of 4×4-pixel blocks, a smaller evaluation coefficient is specified for a block closer to a lower right 4×4-pixel block.

6. The video encoder according to claim 1, wherein the means for determining the coding prediction mode includes:
    first mode selecting means for selecting either a 16×16 intra-prediction mode candidate or a 4×4 intra-prediction mode candidate, using the secondary evaluative value, and
    second mode selecting means for selecting either an intra-prediction mode or an inter-prediction mode, and
    wherein the coding prediction mode is determined in accordance with a result of the selection by the first selecting means and a result of the selection by the second selecting means.

7. The video encoder according to claim 6, wherein the means for determining the coding prediction mode further includes:
    prediction mode limiting means for limiting a number of 4×4 intra-prediction modes to at least one if the first mode selecting means has selected a 4×4 intra-prediction mode and if the second mode selecting means has selected the intra-prediction mode, using the 4×4 intra-prediction mode candidates, and
    means for calculating a tertiary evaluative value for each of at least two modes, in accordance with the at least two modes, if the prediction mode limiting means has limited the number of intra-prediction modes to the at least two, using a local decoding image signal as a reference image, and
    wherein one of the at least two 4×4 intra-prediction modes is determined to be the coding prediction mode in accordance with the tertiary evaluative values.

8. A portable radio terminal device comprising the video encoder according to claim 1, wherein a coded bit stream is obtained by using the video encoder to code the motion picture signal.

9. A video encoder which codes a motion picture signal, the video encoder comprising:
    converting means for subjecting a predictive residual signal to a simplified orthogonal transformation to generate a converted image signal;
    means for calculating each primary evaluative value of a plurality of primary evaluative values corresponding respectively to a plurality of 4×4 intra-prediction modes with different prediction directions, for each of sixteen 4×4-pixel blocks included in each of a plurality of macro-blocks, each macro-block comprising sixteen 4×4-pixel blocks, using an added image signal obtained by adding the converted image signal to a predicted image signal as a reference image signal;
    means for determining a 4×4 intra-prediction mode candidate in accordance with the primary evaluative values;
    means for calculating each of a plurality of secondary evaluative values corresponding respectively to 4×4 intra-prediction mode candidates for each macro-block, by applying to the primary evaluative values for the 4×4 intra-prediction mode candidates, weight summing which uses evaluation coefficients corresponding to positions of each of the 4×4-pixel blocks in the macro-block;
    means for determining a coding prediction mode for each macro-block, using the secondary evaluative values; and
    means for coding the motion picture signal in accordance with the coding prediction mode.

10. The video encoder according to claim 9, wherein the means for calculating the primary evaluative value calculates the primary evaluative value using the following equation:

$$J = SAD + \lambda * R$$

where J is the primary evaluative value, SAD represents a sum of absolute differences resulting from a 4×4 intra-prediction mode, λ represents a constant, and R represents an amount of codes representing the coding prediction mode.

11. The video encoder according to claim 9, wherein the means for calculating the primary evaluative value calculates the primary evaluative value using the following equation:

$$J = SATD + \lambda * R$$

where J is the primary evaluative value, SATD represents a sum of absolute transformed differences obtained by subjecting predictive residuals resulting from a 4×4 intra-prediction mode to a Hadamard transformation, λ represents a constant, and R represents an amount of codes representing the coding prediction mode.

12. The video encoder according to claim 9, wherein the means for calculating the secondary evaluative value calculates the secondary evaluative value using the following equation:

$$E = \sum_{i=0}^{15} (Ji \times wi)$$

where E represents the secondary evaluative value, i represents a 4×4-pixel block number, Ji represents a corresponding primary evaluative value, and wi represents a corresponding evaluation coefficient.

13. The video encoder according to claim 9, wherein for the plurality of 4×4-pixel blocks, a smaller evaluation coefficient is specified for a block closer to a lower right 4×4-pixel block.

14. The video encoder according to claim 9, wherein the means for determining the coding prediction mode includes:
   first mode selecting means for selecting either a 16×16 intra-prediction mode candidate or a 4×4 intra-prediction mode candidate, using the secondary evaluative value, and
   second mode selecting means for selecting either an intra-prediction mode or an inter-prediction mode, and
   wherein the coding prediction mode is determined in accordance with a result of the selection by the first selecting means and a result of the selection by the second selecting means.

15. The video encoder according to claim 14, wherein the means for determining the coding prediction mode further includes:
   prediction mode limiting means for limiting a number of 4×4 intra-prediction modes to at least one if the first mode selecting means has selected a 4×4 intra-prediction mode and if the second mode selecting means has selected the intra-prediction mode, using the 4×4 intra-prediction mode candidate, and
   means for calculating a tertiary evaluative value for each of at least two modes, in accordance with the at least two modes, if the prediction mode limiting means has limited the number of intra-prediction modes to the at least two, using a local decoding image signal as a reference image, and
   wherein one of the at least two 4×4 intra-prediction modes is determined to be the coding prediction mode in accordance with the tertiary evaluative values.

16. A portable radio terminal device comprising the video encoder according to claim 9, wherein a coded bit stream is obtained by using the video encoder to code the motion picture signal.

* * * * *